United States Patent [19]

Norton et al.

[11] 4,092,714

[45] May 30, 1978

[54] PARALLEL COMMAND-STATUS INTERFACE THROUGH MULTIPLEXED SERIAL LINK

[75] Inventors: Thomas R. Norton, Newport Beach; Stephen I. Geller, Pasadena, both of Calif.

[73] Assignee: Xerox Corporation, Stamford, Conn.

[21] Appl. No.: 746,562

[22] Filed: Dec. 1, 1976

[51] Int. Cl.² ........................... G06F 3/00; G06F 3/12
[52] U.S. Cl. ................................................ 364/200
[58] Field of Search ............................... 364/200, 900

[56] References Cited

U.S. PATENT DOCUMENTS

| | | | |
|---|---|---|---|
| 3,344,401 | 9/1967 | MacDonald et al. | 364/200 |
| 3,638,197 | 1/1972 | Brennal, Jr. et al. | 364/900 |
| 3,699,525 | 10/1972 | Klavins | 364/200 |
| 3,771,135 | 11/1973 | Huettner et al. | 364/200 |
| 3,959,776 | 5/1976 | Morley | 364/900 |
| 3,984,662 | 10/1976 | Sorenson | 364/900 |

Primary Examiner—Harvey E. Springborn
Attorney, Agent, or Firm—James J. Ralabate; Franklyn C. Weiss; Irving Keschner

[57] ABSTRACT

Method and apparatus for interconnecting parallel command data in a controller and parallel status data in a controlled device by transmitting the command and status data between the controller and controlled device through serial data links. The serial data links to and from the controller pass through electromagnetic radiation filters to prevent any radiation from leaving the controller through the interconnecting command and status data lines.

16 Claims, 9 Drawing Figures

PARALLEL COMMAND-STATUS INTERFACE THROUGH MULTIPLEXED SERIAL LINK

BACKGROUND OF THE INVENTION

1. Field of the Invention

The present invention relates generally to data transmitting techniques and more particularly to techniques for transmitting parallel command and status data with as few data lines as possible.

2. Description of the Prior Art

Conventional techniques for interconnecting a controller, such as a computer, to a controlled device, such as a printer, provide for a command bus typically including a plurality of electrical conductors between the computer and printer and, similarly, a status bus, also including a plurality of electrical conductors between the printer and computer. In a number of installations, this technique functions adequately but, in installations where the computer may be a relatively great distance from the controlled printer the command and status buses connected between the computer and printer must be relatively long, multiconductor cables which are quite expensive.

Also, particular applications require that no electromagnetic radiation, generated by the high speed data processing circuits, be emitted from the computer equipment. To insure that such radiation is not emitted, it is necessary to pass each wire that leaves the computer installation through a relatively elaborate electromagnetic radiation filter. Thus, a large number of expensive filters are required in order to interconnect the controller and printer through the command and status buses.

Thus, there has long been a need in the data processing field for a technique for interconnecting the command and status buses of a controller and controlled device over relatively long distances, and without electromagnetic radiation, which would not require long lengths of expensive cable nor an elaborate array of radiation filters. The present invention satisfies that need.

SUMMARY OF THE INVENTION

The present invention provides a method and apparatus for interconnecting the parallel command data from a controller, such as a computer, and the parallel status data from a controlled device, such as a printer, by means of serial data links. The presently preferred embodiment of the interface system is designed for use in systems in which each data line leaving the controller must pass through an electromagnetic radiation filter. Thus, the serial data link technique of the present invention has great advantage in that only a single serial data line is required to transfer a multi-bit command data word to the controlled device and, similarly, a single status data line is required to transfer the multi-bit status data from the controlled device to the controller. In the presently preferred embodiment of the invention, an additional clock line is utilized to synchronize the logic in a controller interface with the logic in a controlled device interface.

Thus, control and status data are intercommunicated between the controller and controlled device through only three lines which must be radiation filtered. As the command and status words in the system in which the present invention is utilized are each 16 bits long, it will be appreciated that a considerable savings in cabling and electromagnetic radiation filters is realized.

In the system of the invention, the controller interface and controlled device interface are synchronized by providing the command data word with a synchronization code (sync code) which, upon receipt in the controlled device interface, initiates a timed loading sequence for insertion of a status data word into the serial data link. The controller interface and controlled device interface are then synchronized and the controlled device merely counts the data bit input and, for the proper data word length, decodes that bit combination as a status data word. Thereafter, successive bit combinations are also simply decoded as status data words. Thus, a plurality of status data words are simply decoded in the controller interface in between synchronizing command data words. In this system, the number of dedicated data bits necessary to synchronize the system is therefore held to a minimum.

In addition, since the controller interface and controlled device interface must perform some decoding operations, there has been provided an initial examination of the incoming status data word to detect a status condition which will require immediate attention by the controller or computer. Thus, the detection of that priority condition or interrupt is made quickly within the controller interface without requiring the controller to process the status data word to determine those conditions.

These and other features of the present invention will be apparent from the following detailed description when taken in conjunction with the accompanying drawings.

DESCRIPTION OF THE PREFERRED EMBODIMENT

Figure 1:
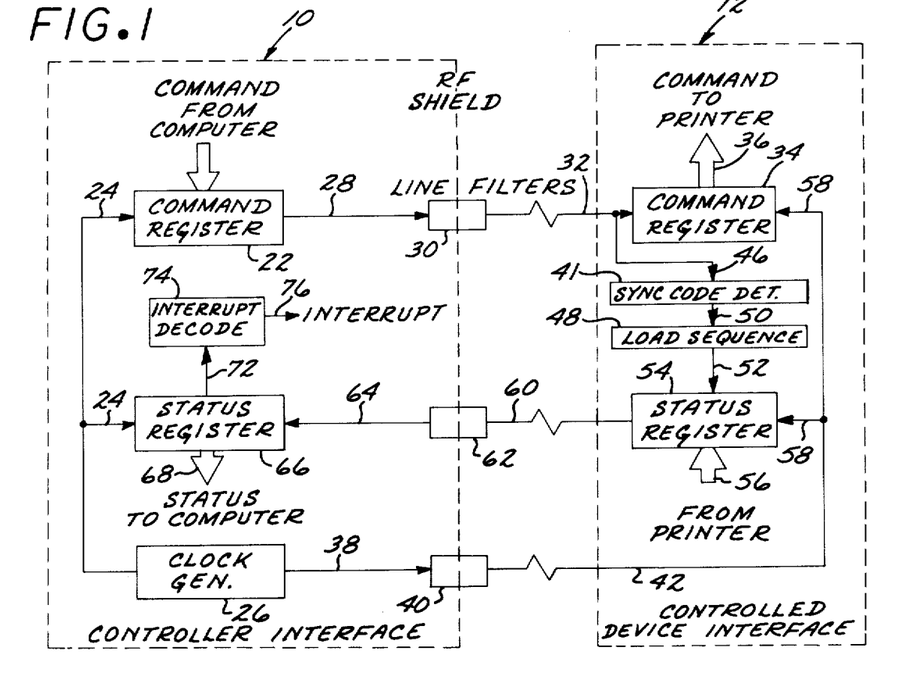
FIG. 1 is a block diagram of the interconnecting system of the present invention illustrating its operating environment.

Turning now to the drawings, and particularly FIG. 1 thereof, a block diagram illustrates the interconnecting system of the present invention in a particular environment. In the illustrated embodiment of the invention, the system is designed to interconnect a controller, such as a computer, with a controlled device, such as a printer. As is well known, the operation of a substantially mechanical device by a computer normally requires that the computer command that the printer perform a particular function and that the printer return information to the computer which indicates that the function has been performed.

Figure 2:
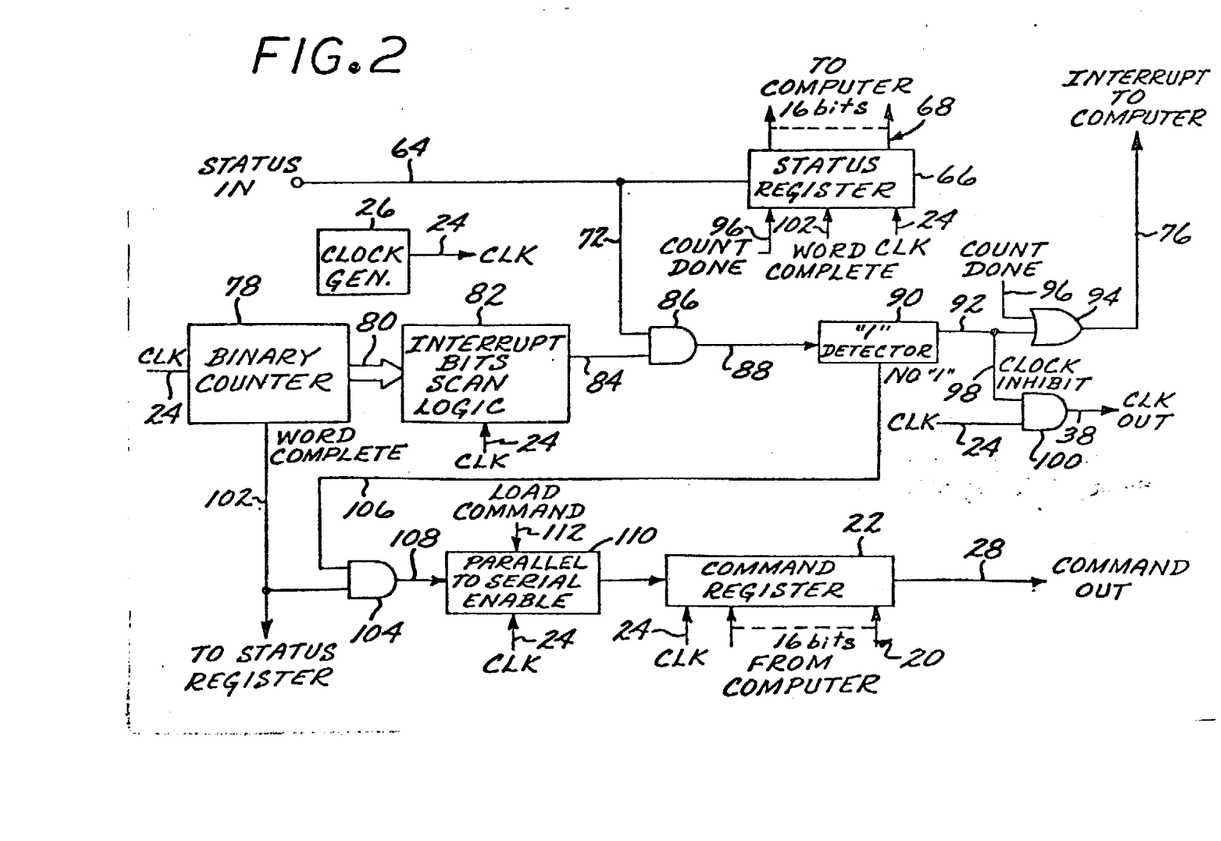
FIG. 2 is a block diagram of the controller interface portion of the system of the invention.

In the system of the invention illustrated in FIG. 2, a controller interface section 10 is mounted in the same housing with the controller or computer itself and is itself interconnected with the computer via a number of control lines. Similarly, a controlled device interface section 12 is housed with the printer and is also interconnected with it via similar control lines. It should be appreciated that the controller interface section 10 and the controlled device interface section 12 transmit command and status data words between themselves and only output that data to the respective computer or printer when properly received. Similarly, the controller and controlled device interface sections 10 and 12, respectively, accept command and status data from the computer and printer, respectively, and only transmit that data when the interface timing is correct. Since the operation of the printer, a mechanical device, is considerably slower than the operation of the computer, the additional time required for interface processing is negligible.

The operation of the system of the invention proceeds as follows in the block diagram shown in FIG. 1. A command from the computer on a parallel bus 20 is gated in parallel into an output command register 22 in the controller interface 10 and clock pulses on a line 24 from a clock generator 26 gate the command in register 22 serially out over a line 28 through an electromagnetic radiation line filter 30 and then through a line 32 serially into an input command register 34 in the controlled device interface 12. The command is then gated out in parallel on a line 36 to the printer. The system is operated synchronously by applying the clock pulses on a line 38 through a similar electromagnetic radiation filter 40 through a clock line 42 in the controlled device interface 12 which is connected to the input command register 34.

The operation of the controller and controlled device interfaces 10 and 12, respectively, is further synchronized by searching an incoming command with a sync code detector 44 connected to the command register through a line 46 and, when the sync code is detected, enabling a load sequence generator 48 through a line 50. The load sequence signals are applied through a line 52 to a status register 54 to gate the status data on a bus 56 into the register 54 at the proper time. When the status data has been loaded into the status register 54, clock pulses applied to the register through a line 58 serially gates out the data through a line 60 back to another electromagnetic radiation line filter 62 into the controller interface 10 on a line 64. The data on line 64 is serially read into a status register 66 and thereafter gated out in parallel on a bus 68 to the computer. Again, the system is maintained in synchronism by applying the clock pulses on a line 70 to the status register.

As the status of the printer may require its operation to be ceased, the data in the status register is connected through a line 72 to an interrupt decoder 74 which detects certain status bit patterns and generates an interrupt signal connected through a line 76 to the computer, which may then cease to send commands to the printer until it is again ready. The internal operation of the computer and the printer forms no part of the present invention and is therefore not further described.

FIG. 2 is a more detailed block diagram of the controller interface section 10 of the invention. The operation of the FIG. 2 block diagram can best be understood by considering FIG. 5, which is a diagrammatic representation of the status data word and what each of the 16 bits represents.

Figure 5:
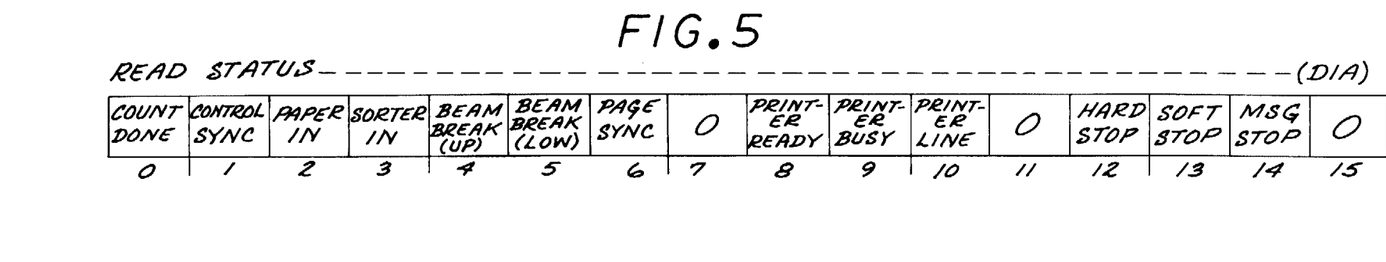
FIG. 5 is an illustration of the status data word generated by the controlled printer.

In particular, the status data word represented by FIG. 5 is serially read into the status register 66 on line 64. Simultaneously, clock pulses on line 24 from the clock generator 26 are applied to a binary counter 78 which has the output of all four bits on a bus 80 which is connected to an interrupt bit scan logic block 82 which, for synchronization, also has a clock input on line 24. The status data word is read into the status register with bit 15 first and, for bits 1 through 6, an enabling output is generated on a line 84. Due to the nature of the indication of bits 0 through 6 (see FIG. 5), it is necessary to send an interrupt signal to the computer if there is a signal, or a "1" in any of those positions. The enabling signal on line 84 is applied to a first input of an AND gate 86, the second input being the status data bits on line 72 which, when AND gate 86 is enabled, permits that data to pass through a line 88 to a "1" detector 90 which generates an output on a line 92 which is applied to one input of an OR gate 94 which passes that signal through to line 76 which is an interrupt signal to the computer.

The "0" bit of the status data word is internally generated by the computer and a binary "1" in that position (FIG. 5) indicates that there is no more data to be printed at the moment. This signal also requires an interrupt to the computer and a COUNT DONE signal on line 96 is applied as a second input to the OR gate 94 and will also generate the interrupt signal on line 76. When an interrupt signal is generated, it is necessary to cease the operation of the printer interface section so the "1" signal on line 92 is connected on line 98 as an inhibit signal for an AND gate 100 which prohibits the clock signals on line 24 from being outputed on line 38 to the printer interface.

To output a command when it is generated by the controller, the reception of a status data word must first be completed and, when the binary counter indicates that 16 bits have been counted, a WORD COMPLETE signal is generated on a line 102 which is connected as a first input to an AND gate 104, the second input of which is a signal on line 106 indicating that no interrupt bit has been detected. The word complete signal on line 102 is also connected as a signal to the status register 102 which gates the status data word out in parallel to the controller. If the output on line 108 of the AND gate 104 indicates that a command data word can be transferred, a parallel-to-serial enable block 110 is activated and, if there is a command data word to be transmitted, a LOAD command data word signal on a line 112 generated by the controller causes the 16 parallel bits on the bus 20 to be loaded into the command register. Thereafter, the parallel-to-serial enable causes the clock signals on line 24 to serially read out the command word on line 28.

Figures 3, 4:
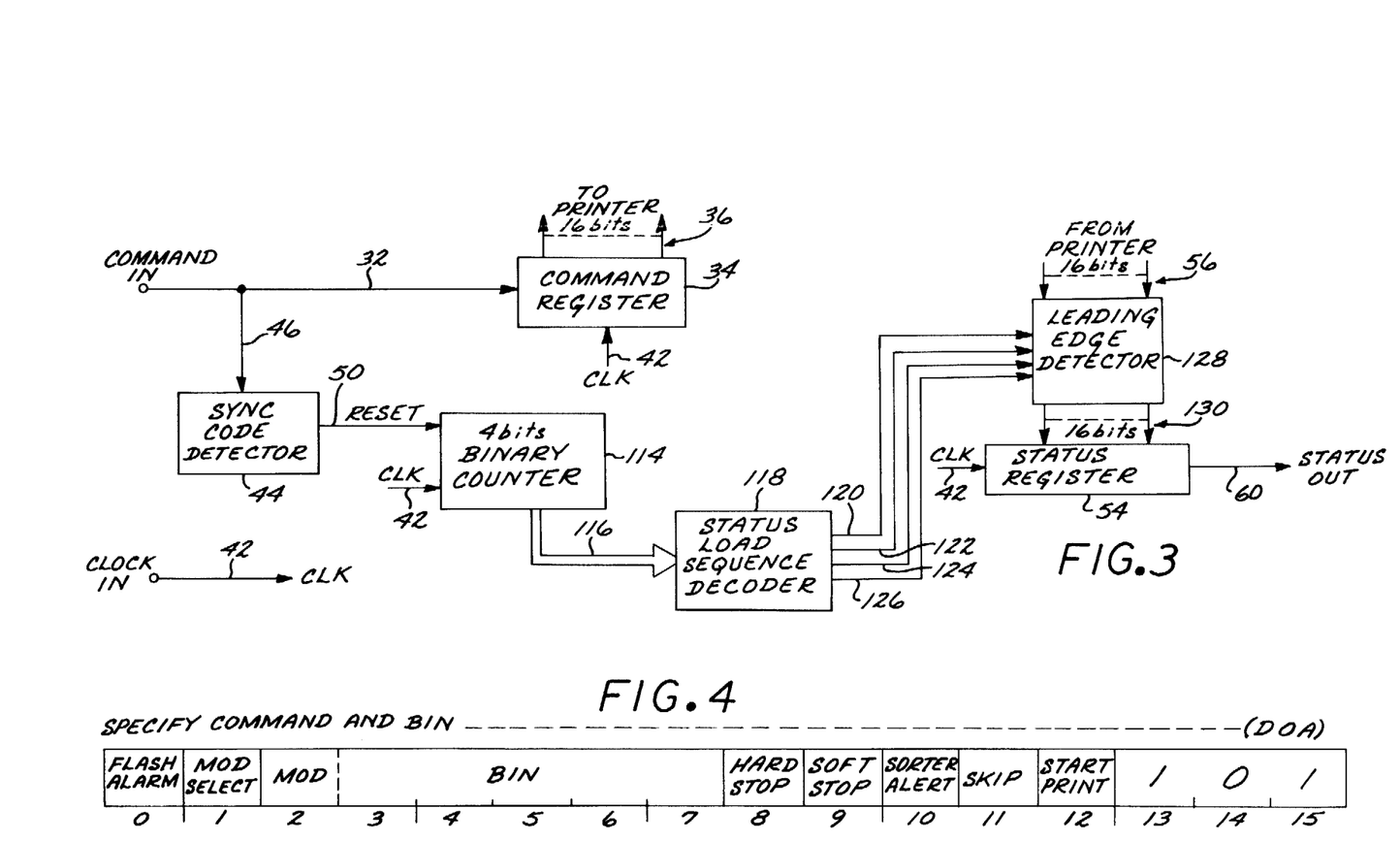
FIG. 3 is a block diagram of the controlled device interface portion of the invention.
FIG. 4 is an outline of the command data word generated by the controller including an illustration of the sync code.

FIG. 3 is a more detailed block diagram of the controlled device interface section 12 of the system of the invention and FIG. 4 is a diagram of the contents of a command data word, as described above. As briefly noted above with respect to FIG. 1, the command data word is serially read in on a line 32 into the command register 34 under clock control from a line 42. In addition, the command data word bits are directed over a line 46 to a sync code detector 44 which generates a reset signal on a line 50 if the bits 15, 14 and 13, in that sequence, are received with the correct sync code. As noted above, the reset signal begins the operation of a load sequence section 48 which has been expanded in FIG. 3 to describe its operation.

In particular, the reset signal resets a four-bit binary counter 114 which then begins counting under clock control from a line 42 from the controller interface section 10. The four outputs of the four-bit binary counter are delivered over a bus 116 to a status load sequence decoder 118 which, for the last four bits of the command word generates a bit sequence over lines 120, 122, 124 and 126 which sequentially transfers the 16 bits in the printer bus 56 through a leading edge detector 128 to load those status bits as pulses through a bus 130 into the status register 54. The clock input on line 42 to the status register is running continuously and, one bit time after the loading of the status data word into the status register 54, that status data word is serially read out over line 60, as described above.

The last load sequence signal on line 26 which loads the status register 54 is also connected as a control signal to the command register 34 to transfer the command data word in parallel through the bus 36 to the printer. Thus, the command data word is transferred to the printer over bus 36 simultaneously with the loading of the status data word on bus 130 into the status register 54.

Figure 6:
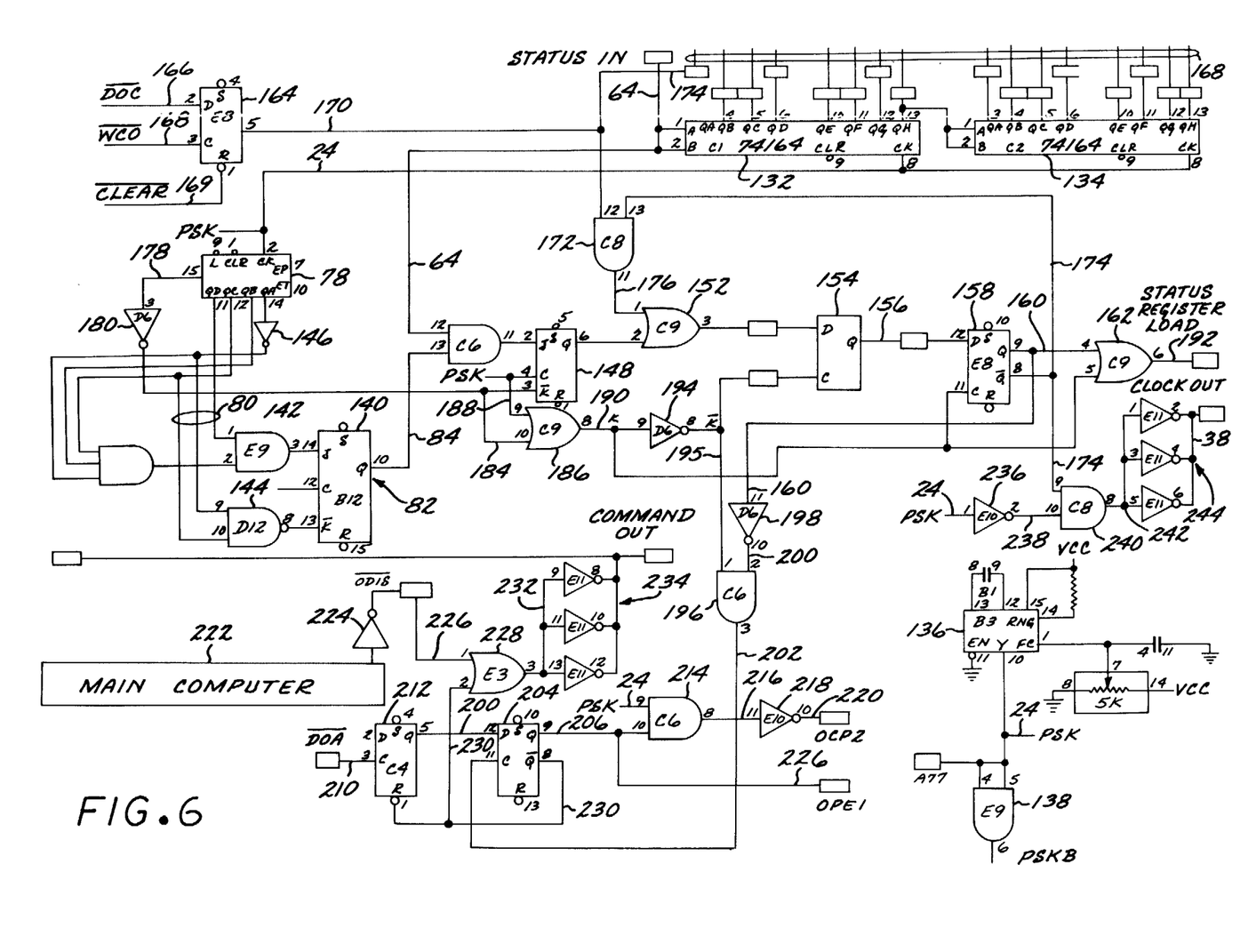
FIG. 6 is an electrical schematic diagram of the computer interface portion of the presently preferred embodiment of the invention.

FIG. 6 is a detailed logic diagram of the controller interface section of the system of the invention. It should be appreciated that the controller interface has many interconnections with a standard digital computer which, in the circuitry depicted in FIG. 6, is a Data General Eclipse Model S/200, available from Data General Corporation, Route 9, Southboro, Mass. 01772. Thus, the command data words generated by the computer partially determine the operation of the computer interface circuitry shown. Also, in some cases such as the interrupt bits on the status data word, the only output of the interface circuitry is a signal indicating an interrupt.

In that light, the status data word input on line 64 is serially entered into the status register comprising a pair of eight bit shift registers 132 and 134 which are commercially available under the type number shown. The status data word is shifted into the shift registers 132 and 134 under clock control (PSK) on line 24. The actual clock circuitry is illustrated as a separate circuit and includes a monostable multivibrator 136 generating one clock output (PSK), with another clock output (PSK B) being generated through a voltage level controlling AND gate 138.

The clock signal PSK is also applied to the clock input of a four-bit binary counter 78 which connects two of its outputs directly and a third through an inverter 141 through the bus 80 to the interrupt bit scan logic 82 which includes a J-K flip-flop 140, an AND gate 142, a NAND gate 144 and an AND gate 146. As described above, there will be an output on line 84 from the J-K flip-flop 140 for bits 1 through 6 of the status data word. The enabling signal on line 84 is applied as one input to the AND gate 86 which has as its other input the status bits on line 64. The interrupt decoder 74 (FIG. 1), which includes the "1" detector 90 (FIG. 2), includes the J-K flip-flop 148 which has a J signal input on line 88 only if one of the status bits is a "1" signal. If a "1" is detected, the Q output on line 150 of the J-K flip-flop 148 passes through an OR gate 152 to the D input of a D flip-flop 154. When the D flip-flop is set, its Q output on line 156 is connected to the D input of another D flip-flop 158 whose Q output on line 160 is a disabling signal to an OR gate 162, which functions as an AND gate, in the negative logic sense, at this particular point in the logic circuitry. The effect of the disabling signal on line 160 will be discussed in more detail below.

From the discussion above with respect to FIG. 2, the interrupt signal can also be generated by signals derived directly from the computer. Thus, a D flip-flop 164 receives as its input three control signals from the computer, $\overline{DOC}$ on line 166, $\overline{WCD}$ on line 168 and $\overline{CLEAR}$ on line 169. The effect of the $\overline{DOC}$ on line 166 indicates that there is no more data to print so no further commands should be sent to the computer. Thus, the $\overline{DOC}$ signal sets the Q output of flip-flop 164 on line 170 as an input to an AND gate 172 which is also connected to the "0" bit of the received status word on line 174. AND gate 172 is enabled by the $\overline{Q}$ signal on line 174 from the D flip-flop 158. The output of AND gate 172 is connected through line 176 as a second input to OR gate 152 which also results in the generation of the inhibit signal on line 160.

If no interrupt bits are detected, when the binary counter 78 reaches its full count of 16 it generates a carry over signal on line 178 which is connected through an inverter 180 and line 182 to the $\overline{K}$ input to J-K flip-flop 148 and also as a first input on line 184 to the OR gate 186, which functions as an AND gate in this circuit and is enabled by the clock signal PSK on its second input 188. Thus, a full-count signal plus a clock signal generates a K signal on line 190 which is also connected as the clock signal to flip-flop 158 and is connected as a second input to the OR gate 162, which functions as an enabled AND gate. Thus, when all 16 bits have been entered into the shift registers 132 and 134 without an interrupt signal being generated, a signal on the output of OR gate 162 is connected as a STATUS REGISTER LOAD signal on line 192 to the general purpose computer which then gates in parallel the outputs of the shift registers 132 and 134 in parallel through bus 168 into its own registers for further processing.

In addition to the signal on line 192 to the general purpose computer, the K signal on line 190 is inverted through inverter 194 and connected through line 195 as one input to AND gate 196. The enabling input to gate 196 is the Q output of flip-flop 158 on line 160 which is inverted through inverter 198 and connected through line 200 as the enabling signal for AND gate 196. The output of AND gate 196 on line 202 is a signal indicating that the command data word, if present, be transmitted to the controlled device interface. This is accomplished by connecting the command transmit signal on line 202 as the clock input to a D flip-flop 204 which will generate a transmit signal on line 206 only if there is an enabling D input on line 208.

Whether there is an enabling input on line 208 is dependent upon the signal $\overline{DOA}$ on line 210 which is a computer signal indicating that a command is ready to be parallel loaded and serially transmitted. The $\overline{DOA}$ signal on line 210 is the clock input to a D flip-flop 212 which provides an enabling signal on line 208 which then provides an enabling signal to an AND gate 214 which has as its second input the clock pulses on line 24. The clock pulses are then passed through AND gate 214 on line 216 through an inverter 218 to provide an output clock pulse enable signal on line 220 which is sent to the general purpose computer to serially output the data in the main computer register 222 through an inverter 224 which forms an output data input on line 226 to one input of an OR gate 228, which functions as an enabled AND gate in this circuit. The OR gate 228 is enabled by the $\overline{Q}$ output of flip-flop 204 on line 230 which permits the transmission of the command data word on line 226 through the OR gate 228 to the inputs on lines 232 of three parallel connected inverters 234 which increase the power level output on line 28 which is the command word output to the printer interface.

As noted above with respect to FIG. 2, when an interrupt signal is generated, it is desirable to inhibit the clock pulses from reaching the printer interface section. Thus, the clock pulses on line 24 are passed through an inverter 236 to a line 238 which is a clock pulse input to an AND gate 240. The AND gate 240 is enabled or disabled by the $\overline{Q}$ output of flip-flop 158 on line 174 to inhibit passage of the clock pulses through the AND gate 240 to line 242 which serves as the input to a series of parallel connected inverters 244 which increases the power level output on line 38 to the printer interface.

As was briefly noted above, the command and status data words as well as the clock signal are connected through the computer housing through electromagnetic radiation line filters. This interconnection is more clearly illustrated in FIG. 9 which shows the various stages which these signals must pass through before they result in radiation-free signals which may be transmitted to and from the printer interface. Thus, in FIG. 9, the command data output on line 28, the clock output on line 38 and the status data input on line 64 first pass through the main computer (CPU) back plane slots and are connected via an internal cable to the CPU I-Q connector to an external cable to the isolator terminal board that serves as the input to isolator line drivers 250, 252 and 254, which are commercial units available from Litronics and Texas Instruments.

Figure 9:
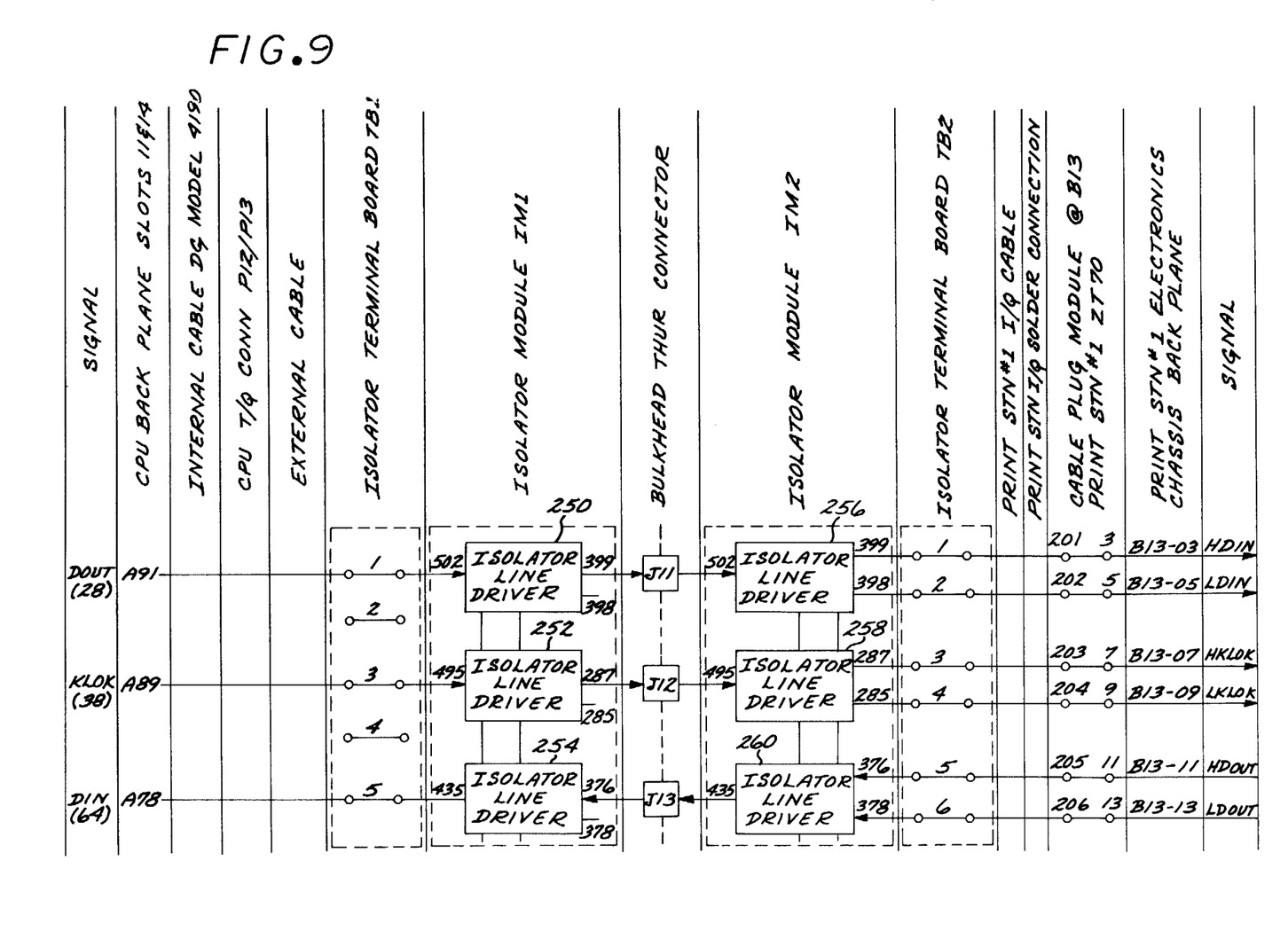
FIG. 9 is a diagram of the electrical and mechanical steps utilized in electromagnetically filtering the electrical signals in the controller interface to prevent radiation from those lines.

The outputs of the line drivers 250, 252 and 254 are passed through the bulkhead through connector to another set of isolator line drivers 256, 258 and 260, whose outputs are two 180° out-of-phase signals in order to enhance proper detection of the signals by the controlled device interface. The outputs of the line drivers 250, 258 and 260 are connected to the isolator terminal board and thence through a print station No. 1 I-O cable, the print station I-O solder connection to the cable plug module on print station No. 1. From the cable plug, the signals are connected to the print station No. 1 electronics chassis back plane which results in the signals being available in the controlled device interface.

Figure 7:
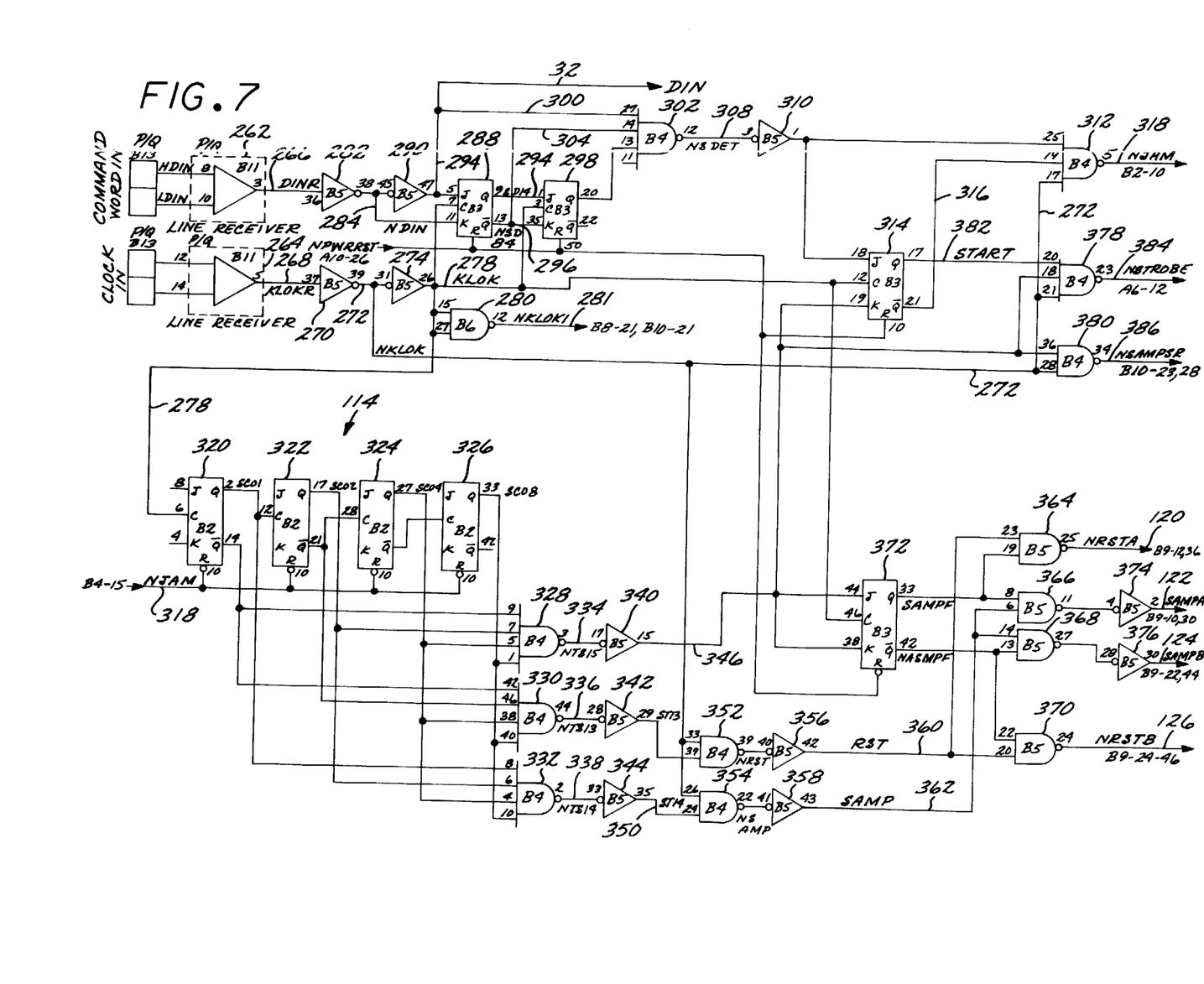
FIG. 7 is an electrical schematic diagram of a portion of the printer interface portion of the presently preferred embodiment of the invention.
Figure 8:
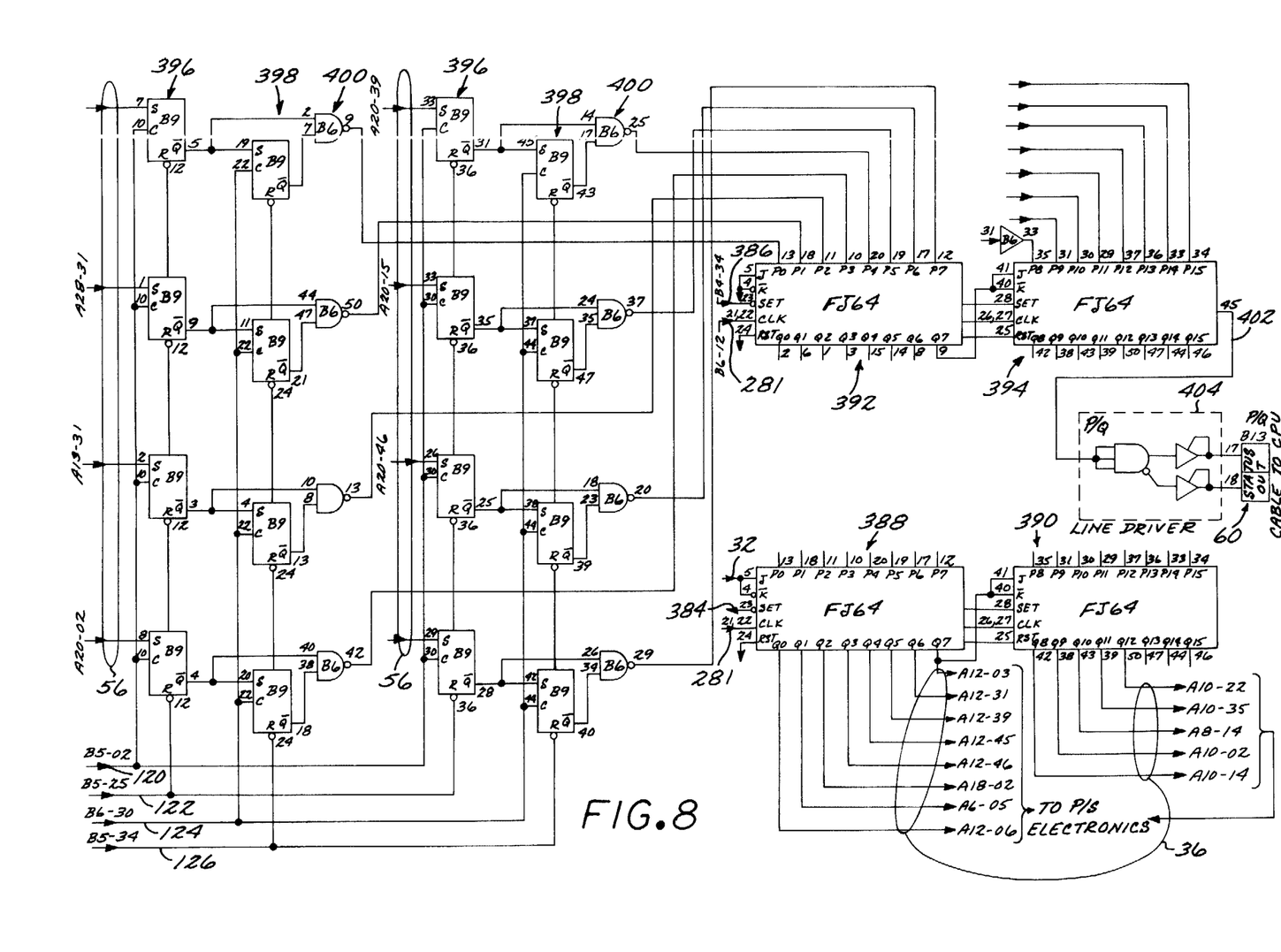
FIG. 8 is an electrical schematic diagram of another portion of the printer interface portion of the invention.

FIGS. 7 and 8 are detailed logic diagrams of the controlled device interface section of the system of the invention. The incoming command data and clock signals are illustrated in FIG. 7 and the status data word output is illustrated in FIG. 8. In FIG. 7, the 180° out-of-phase command and clock signals are passed through conventional line receivers 262 and 264, as noted above, to generate single command data-in and clock-in signals on lines 266 and 268. The clock input signals on line 268 are passed through an inverter 270 to form the NKLOK signal on line 272 and inverted once more through inverter 274 to form the clock (KLOK) signal on line 278. The clock signal is inverted once more through the NAND gate 280 to form the delayed NKLOKI signal. These clock signals are used to clock the remaining logic circuitry in the controlled device interface section 12 of the system.

As was described above with respect to FIG. 3, the command data word input signals are sent to the command register and also to a sync code detector to synchronize the data transfers of both the controller interface section 10 and the controlled device interface section 12. Thus, the command data input on line 266 is passed through a first inverter 282 to form an inverted data output on line 284 to the K input of a J-K flip-flop 288 and inverted again through inverter 290 to form the J input on line 292 to the flip-flop 288. The Q and $\overline{Q}$ signals on lines 294 and 296 of flip-flop 288 are connected directly to the J and K inputs of fli-flop 298 with both flip-flops being clocked from the KLOK clock signal on line 278.

The output on line 292 of inverter 290 is connected both to the command register through line 32 and as one input on a line 300 to a four input NAND gate 302. A second input on line 304 to the NAND gate 302 is derived from the Q output of flip-flop 288 and a third input on line 306 to NAND gate 302 is derived from the Q output of flip-flop 298. The flip-flops 288 and 298 and the NAND gate 302 form the sync code detector 44 shown in FIG. 3 and generate an output on line 308 which passes through inverter 310 on a line 311 to both a first input to a three-input NAND gate 312 and also to the J input of a flip-flop 314. The $\overline{Q}$ output on line 316 from flip-flop 314 forms a second input to the NAND gate 312 with a third input being the NKLOK signal on line 272. An output on line 318 from the NAND gate 312 corresponds to the reset signal on line 50 if FIG. 3 and is connected to the reset terminals of a four-bit binary clock 114 (FIG. 3) comprised of four J-K flip-flops 320, 322, 324 and 326.

The four-bit binary counter 114 is clocked by the clock signal on line 278 and counts down to the last four bits of the incoming command word input. Since three of the incoming bits were the sync code bits, the four-bit binary counter is preloaded with the number 13 rather than 16 and their outputs are appropriately connected as inputs to three NAND gates 328, 330 and 332 which generate as their outputs the detection of the counter state 15 on line 334, 13 on line 336 and 14 on line 338. These signals are inverted through inverters 340, 342 and 344 to generate outputs on lines 346, 348 and 350, respectively.

The signals on lines 348 and 350 are clocked through NAND gates 352 and 354, respectively, and inverted by inverters 356 and 358, respectively, to form signals on lines 360 and 362 which serve as inputs to a series of NAND gates 364, 366, 368 and 370 which, together with a J-K flip-flop 372 and inverters 374 and 376 correspond to the status load sequence decoder 118 shown in FIG. 3. The outputs of the status load sequence decoder 118 on lines 120, 122, 124 and 126 serve as control signals for the leading edge detector 128 shown in FIG. 3. While those four signals serve to load the status register, further logic signals generated by flip-flop 314 and NAND gates 378 and 380 serve to operate the command register and gating it out in parallel at the proper time as detected by the status load sequence decoder 118. Therefore, the inverted bit 15 detected signal on line 346 is connected to the K input of flip-flop 314 and as one input to the NAND gate 378 and the NAND gate 380. The Q output of flip-flop 314 is connected as a start signal on line 382 to a third input to the NAND gate 370. The outputs of AND gates 378 and 380 on lines 384 and 386, respectively, serve to control the parallel gating of the command data word out to the printer and to control the gating of the parallel status word into the status register 54.

Turning now to FIG. 8, the command register comprises two 8 bit shift registers 388 and 390, respectively, and the command data input on line 32 is connected to the J and $\overline{K}$ inputs of shift register 388. The clock signal on line 381 is connected to both shift registers 388 and 390. At the appropriate time, the command signals on the command bus 36 are gated out in parallel to the printer electronics.

The status register 54 of FIG. 3 also comprises two 8-bit shift registers 392 and 394 connected in series. Again, the clock signal on line 281 is connected to the clock inputs of both shift registers 392 and 394. The NSAMPSR signal on line 286 is connected to the set input of register 392. The 16-bit status bus from the printer (only half being illustrated) is shown as the set inputs to a first set of set-reset flip-flops 396. The clock inputs of the first set of set-reset flip-flops 396 is the first signal on line 120 from the status load sequence decoder and the reset inputs to the first set of flip-flops 396 is derived from the second signal on line 122 from the status load sequence decoder 118. The $\overline{Q}$ outputs of the first set of flip-flops 396 are connected to the set inputs of a second set of set-reset flip-flops 398 and also to a first input to a set of NAND gates 400. The second set of flip-flops 398 are clocked by the third signal on line 124 from the status load sequence decoder 118 and the reset inputs for the second set of flip-flops 398 is from the fourth control line 126 from the status load sequence decoder 118. The $\overline{Q}$ outputs from the second set of flip-flops 398 is connected as a second input to the NAND gates 400, the outputs of which are sequentially connected in parallel to the parallel input terminals of the shift registers 392 and 394.

The leading edge detector 128 serves to isolate the status signals from the parallel inputs to the shift registers 392 and 394 and to provide a sampling sequence whereby the status condition is entered to the parallel inputs of the registers as transitions rather than continuous signals. This is done so that the computer receiving the status need only service the interrupt once rather than at each status transfer. Thus, the series output of the status shift registers 392 and 394 on line 402 is continuous and status is transmitted continuously through line driver 404 to the status output lines 60. A new command data word only provides the sync code which synchronizes the clocks of both the controller and controlled device interface sections 10 and 12 so that the controller interface section 10 simply decodes a new status data word every 16 bits without the status data word having to include sychronization bits.

While a presently preferred embodiment of the invention has been described in detail, it should be appreciated that the invention may be practiced using many other circuit techniques and logic designs. Therefore, the invention is not to be limited except by the following claims.

We claim:

1. Apparatus for interconnecting a controller and a controlled device to transmit parallel data commands from said controller to said controlled device and to transmit parallel status data from said controlled device to said controller, said apparatus comprising:

controller interface means connected to said controller for reading-in parallel command data from said controller into a first register, said command data being read-out in series from said first register to a command output terminal of said controller interface means, and reading-in series status data from a status input terminal of said controller interface means into a second register, said status data being read-out in parallel from said second register to said controller;

controlled device interface means connected to said controlled device for reading-in parallel status data from said controlled device into a third register, said status data being read out of said third register in series to a status output terminal of said controlled device interface means, and reading-in series command data from a command input terminal of said controlled device interface means into a fourth register, said command data being read out of said fourth register in parallel to said controlled device; and means for connecting said command output terminal of said controller interface means to said command input terminal of said controlled device interface means, and connecting said status output terminal of said controlled device interface means to said status input terminal of said controller interface means.

2. The apparatus defined in claim 1, including:

clock means in said controller interface means for controlling parallel-to-serial and serial-to-parallel data transfers in said controller interface means, the output signal of said clock means being connected to a clock output terminal of said controller interface means;

means for connecting said clock output terminal of said controller interface means to a clock input terminal of said controlled device interface means; and means for receiving said clock output signal at said clock input signal of said controlled device interface means and controlling parallel-to-serial and serial-to-parallel data transfers in said controlled device interface means.

3. The apparatus defined in claim 2, wherein:

said controller is mounted in a shielded housing which prevents electromagnetic radiation therefrom; and said command output, status input and clock output terminals include electromagnetic radiation filters to prevent radiation from said housing through said terminals.

4. The apparatus defined in claim 2, wherein:

said command data includes a leading sync code; and said controlled device interface means includes a sync code detector which detects said sync code of said command data, the detection of which synchronizes the status data transmission from said third register to said fourth register with a predetermined number of clock signals, whereby said controller interface means will successively read out status data in parallel to said controller for each predetermined number of clock signals.

5. The apparatus defined in claim 2, wherein:

said status data includes a number of data bits indicative of a controlled device status requiring immediate controller attention; and said controller interface includes an interrupt decoder for detecting said bits and stopping the transfer of command or status data.

6. The apparatus defined in claim 5, wherein:

said interrupt decoder includes clock inhibiting means for inhibiting the transmission of said clock signals to said clock output terminal.

7. The apparatus defined in claim 6, wherein:

said command data includes a leading sync code; and said controlled device interface means includes a sync code detector which detects said sync code of said command data the detection of which synchronizes the status data transmission from said third register to said fourth register with a predetermined number of clock signals, whereby said controller interface means will successively read out status data in parallel to said controller for each predetermined number of clock signals.

8. The apparatus defined in claim 7, wherein:

said controller is mounted in a shielded housing which prevents electromagnetic radiation therefrom; and said command output, status input and clock output terminals include electromagnetic radiation filters to prevent radiation from said housing through said terminals.

9. The apparatus defined in claim 2, wherein:

said command data includes a leading sync code;

said controlled device interface means includes a sync code detector which detects said sync code of said command data the detection of which synchronizes the status data transmission from said third register to said fourth register with a predetermined number of clock signals, whereby said controller interface means will successively read out status data in parallel to said controller for each predetermined number of clock signals; and loading means responsive to said sync code detector for gating said status data into said third register immediately following receipt of command data into said second register.

10. A method of interconnecting a controller and a controlled device to transmit parallel data commands from said controller to said controlled device and to transmit parallel status data from said controlled device to said controller, said method comprising the steps of:

reading-in parallel command data from said controller into a first register of a conroller interface means;

reading-out said command data in series from said first register to a command output terminal of said controller interface means;

reading-in series status data from a status input terminal of said controller interface means into a second register;

reading-out said status data in parallel from said second register to said controller;

reading-in parallel status data from said controlled device into a third register of a controlled device interface means;

reading-out said status data in series from said third register to a status output terminal of said controlled device interface means;

reading-in series command data from a command input terminal of said controlled device interface means into a fourth register;

reading-out said command data in parallel from said fourth register to said controlled device; and connecting said command output terminal of said controller interface means to said command input terminal of said controlled device interface means, and connecting said status output terminal of said controlled device interface means to said status input terminal of said controller interface means.

11. The method defined in claim 10, including the steps of:

controlling the parallel-to-serial and serial-to-parallel data transfers in said controller interface means with a clock means having a clock signal connected to a clock output terminal of said controller interface means;

connecting said clock output terminal of said controller interface means to a clock input terminal of said controlled device interface means; and controlling the parallel-to-serial and serial-to-parallel data transfers in said controlled device interface means with said clock signal.

12. The method defined in claim 11, including the steps of:

mounting said controller and controller interface means in a shielded housing to prevent electromagnetic radiation therefrom; and passing said command output, status input and clock output signals through electromagnetic radiation filters associated with said command output, said status input and said clock output terminals to prevent radiation from said housing through said terminals.

13. The method defined in claim 11, including the steps of:

providing said command data with a leading sync code;

monitoring said incoming serial data word in said controlled device interface means to detect said sync code; and utilizing the detection of said sync code to synchronize the transmission of said status data to said controller interface means.

14. The method defined in claim 11, including the steps of:

specifying that a predetermined number of data bits in said status data word indicate a controlled device status requiring immediate controller attention; and monitoring said status data bits to detect the presence of one of said predetermined number of data bits and stopping the transmission of command and status data upon detection thereof.

15. The method defined in claim 14 including the steps of:

providing said command data with a leading sync code;

monitoring said incoming serial data word in said controlled device interface means to detect said sync code; and utilizing the detection of said sync code to synchronize the transmission of said status data to said controller interface means.

16. The method defined in claim 15, including the steps of:

mounting said controller and controller interface means in a shielded housing to prevent electromagnetic radiation therefrom; and passing said command output, status input and clock output signals through electromagnetic radiation filters associated with said command output, said status input and said clock output terminals to prevent radiation from said housing through said terminals.

* * * * *

UNITED STATES PATENT AND TRADEMARK OFFICE
CERTIFICATE OF CORRECTION

PATENT NO. : 4,092,714

DATED : May 30, 1978

INVENTOR(S) : Thomas R. Norton and Stephen I. Geller

It is certified that error appears in the above-identified patent and that said Letters Patent are hereby corrected as shown below:

Insert Figure 2 as shown on the attached sheet.

In Column 11, line 5, after "said" insert --data--.

Signed and Sealed this

Seventh Day of November 1978

[SEAL]

Attest:

RUTH C. MASON
*Attesting Officer*

DONALD W. BANNER
*Commissioner of Patents and Trademarks*

FIG. 2